(12) United States Patent
Liu

(10) Patent No.: US 7,457,208 B2
(45) Date of Patent: Nov. 25, 2008

(54) METHOD AND APPARATUS FOR DETERMINING POSITION OF OPTICAL PICK-UP HEAD

(75) Inventor: Tun-Hsing Liu, Pingjhen (TW)

(73) Assignee: Mediatek Inc., Hsinchu (TW)

( * ) Notice: Subject to any disclaimer, the term of this patent is extended or adjusted under 35 U.S.C. 154(b) by 543 days.

(21) Appl. No.: 10/907,658

(22) Filed: Apr. 11, 2005

(65) Prior Publication Data

US 2006/0028933 A1    Feb. 9, 2006

(30) Foreign Application Priority Data

Jul. 14, 2004    (TW) .............................. 93120956 A

(51) Int. Cl.
*G11B 7/00*    (2006.01)
(52) U.S. Cl. ................. 369/44.27; 369/53.28
(58) Field of Classification Search .............. 369/53.24, 369/53.3
See application file for complete search history.

(56) References Cited

U.S. PATENT DOCUMENTS

| | | | |
|---|---|---|---|
| 6,407,877 B1 * | 6/2002 | Mitani ..................... | 360/78.11 |
| 6,504,669 B1 * | 1/2003 | Janz et al. ................ | 360/78.05 |
| 6,597,530 B2 * | 7/2003 | Asano et al. ............. | 360/78.14 |
| 6,900,958 B1 * | 5/2005 | Yi et al. ................... | 360/77.02 |
| 6,922,304 B2 * | 7/2005 | Nakagawa ............... | 360/77.08 |
| 7,212,481 B2 * | 5/2007 | Jeong et al. ............. | 369/53.39 |

* cited by examiner

*Primary Examiner*—Joseph H Feild
*Assistant Examiner*—Peter Vincent Agustin
(74) *Attorney, Agent, or Firm*—Connolly Bove Lodge & Hutz LLP

(57) ABSTRACT

The displacement of a pick-up head along the radial direction of an optical disk is detected, and the absolute position of the pick-up head is determined by the accumulation of the displacement, hence the apparatus knows which area on the optical disk the pick-up head currently stays. After obtaining control signals for a motor to drive the pick-up head to move along the radial direction, the apparatus calculates the displacement of the pick-up head during every stroke according the control signals. Afterward, the absolute position is determined by the accumulation of the displacement during all strokes.

21 Claims, 7 Drawing Sheets

| sync | minute | | | | | | | | second | | | | | | | | frame | | | | | | | | CRC code |
|---|---|---|---|---|---|---|---|---|---|---|---|---|---|---|---|---|---|---|---|---|---|---|---|---|---|
| | M1 | x | x | x | x | x | x | x | S1 | x | x | x | x | x | x | x | F1 | x | x | x | x | x | x | x | |

| CONTROL | ADR | TND | INDEX | S | M | F | ...... | |
FIG. 5 (Background Art)
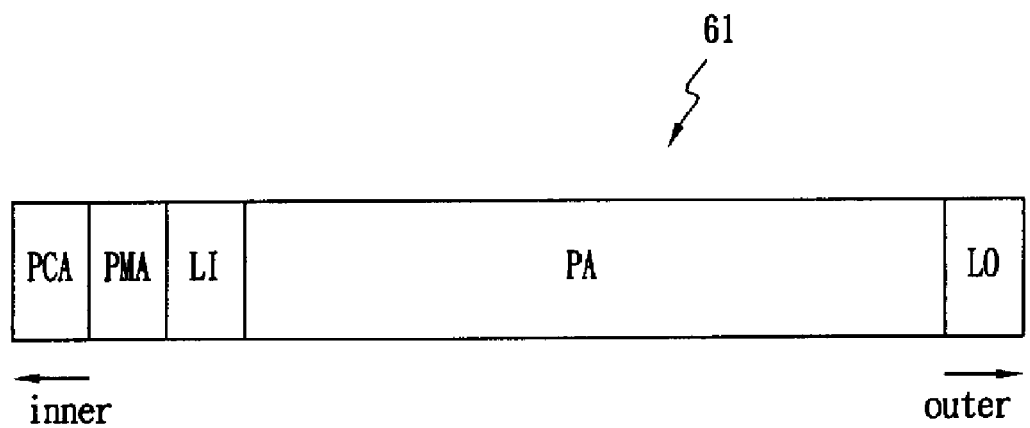
FIG. 6(a) (Background Art)
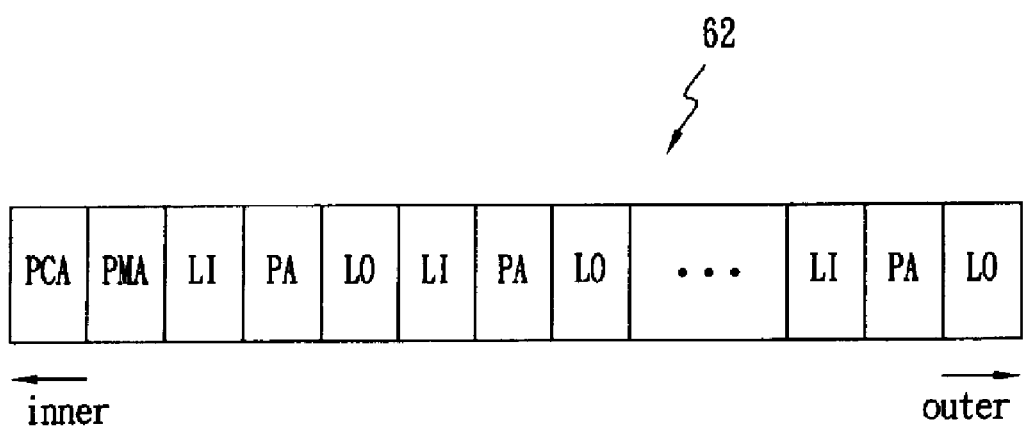
FIG. 6(b) (Background Art)

METHOD AND APPARATUS FOR DETERMINING POSITION OF OPTICAL PICK-UP HEAD

BACKGROUND OF THE INVENTION

1. Field of the Invention

The present invention relates to a method and an apparatus for determining the position of a pick-up head (PUH), more particularly to a method and an apparatus for correctly detecting the absolute position of the pick-up head along the radial direction of an optical storage medium to distinguish between the areas of the same address information thereon.

2. Description of the Related Art

FIG. 1 is a schematic diagram illustrating the information area structure of a quarter of a conventional optical storage medium. At the center of an optical storage medium 10 (for example, an optical disk like the CD-R format or the CD-RW format), there is a center hole 11 for a spindle of an optical storage device to synchronously rotate with the medium 10. The information area of the optical storage medium 10 is sequentially divided into a laser power calibration area (PCA) 12, a program memory area (PMA) 13, a lead-in (LI) area 14, a program area (PA) 15 and a lead-out (LO) area 16 from its interior to its exterior.

When the mold of a recordable optical storage medium is engraved with grooves, the shallow groove starts from the center of the optical storage medium and is spirally formed thereon by means of a laser beam controlled by a predetermined program. Known as a pre-groove, the groove does not look like a smooth spiral, but instead is a spiral that wobbles in a sinusoidal waveform of tiny amplitude. A signal read from the pre-groove is hereinafter referred to as a "wobble signal." Every sector on an optical disk generally fabricated by die-casting contains time-related data for controlling the rotational speed of an optical storage device, in order to correctly read signals recorded on the optical disk.

It is necessary for a recordable optical storage device to guide the laser beam of the pick-up head to move outward in proper sequence and control its rotational speed correctly according to some means. Since the tracking and timing code information is provided by the wobbling pre-groove, such information is called ATIP (Absolute Time In Pre-groove) data. With the data, the recording speed of signals can be kept constant. To record data on a recordable optical disk, the optical storage device adds the address information to the main data, and then the combined data are encoded and scrambled before the processed main data converted by Eight-to-Fourteen Modulation (hereinafter referred to as "EFM signals") are recorded on the tracks of the recordable optical disk. Later on, to retrieve the recorded data, the optical storage device demodulates the EFM signals first and then descrambles and decodes them in order to read the main data and address information. If the EFM signals burned to an optical disk are present, the optical storage device can use such signals to make the optical pick-up head move in proper sequence and control the rotational speed of a spindle motor. On the other hand, after the signals are successfully decoded, the physical address information required for the positioning of the pick-up head can be obtained.

FIG. 2 is a diagram illustrating the scheme of ATIP data. The ATIP data comprises a 4-bit sync code, an 8-bit minute (M) code, an 8-bit second (S) code, an 8-bit frame (F) code, and a cyclic redundancy check code (CRC). ATIP time codes {MM: SS: FF} can define the absolute beginning and the absolute destination of every sub area in an information area of an optical disk and are obtained through the minute codes, second codes, and frame codes; wherein MM, SS and FF denote the minute code (0-99), second code (0-59), and frame code (0-74), respectively.

FIG. 3 is a diagram illustrating the corresponding relationship between an information area and an ATIP time code. Referring to FIG. 3, $t_1$ denotes the start time code of the laser beam power calibration area (PCA) 12, which is set to {95:00:00} in most optical disks, $t_2$ denotes the start time code of the program memory area (PMA) 13, $t_3$ denotes the start time code of the lead-in area (LI) 14, $t_4$ may preferably denote the end time code {99:59:74} of the lead-in area (LI) 14 or the start time code {00:00:00} of the program area (PA) 15, and $t_5$ denotes the last possible start time code of the lead-out area (LO) 16, for example, an 80-minute CD-R disk designates $t_5$ as {79:59:74}.

At present, it is quite common for the program area (PA) 15 of an optical disk to have a capacity greater than 95 minutes, and in consequence it is impossible to map time codes one-to-one and onto the locations of the various areas in the optical disk, as shown in FIG. 4. Obviously, an interval of the time code from {95:00:00} to {99:59:74} can be mapped to two different areas, thus it is impossible to determine the exact position of the pick-up head, as far as its whereabouts is concerned, using the ATIP time code extracted from ATIP information; in other words, the exact position of the pick-up head is necessarily determined by an auxiliary means, such as other conditions or data.

FIG. 5 is a diagram about the structure of subcode-Q data in mode 1. An ADR (address) of 1h indicates mode 1, wherein h denotes a hexadecimal number. A TNO (track number) of 00h indicates that the subcode-Q data is stored at the lead-in area disposed in the innermost tracks. On the contrary, if the TNO is not equal to 00h, the corresponding subcode-Q data may be stored in a program area or a lead-out area. Hence, it is possible to determine the current position of the pick-up head by reading the information of the subcode-Q data with a logic program executed during tracking.

According to the way they are burned, optical disks are divided into two types, namely single-session and multi-session, as shown in FIGS. 6(a) and 6(b). A single-session optical disk 61 can be written once only and thus its data structure is simple; as a result, a TNO of 00h indicates that the subcode-Q data is stored in the lead-in area disposed in the innermost tracks. However, as for a multi-session optical disk 62, it is impossible to determine whether the pick-up head is currently located in a lead-in area (LI) between two program areas (PA) or in the innermost lead-in area (LI), even if the TNO equals 00h.

In general, predetermined functions of an optical disk drive, such as reading recorded data, writing data, reading data of a TOC (table of contents) from a lead-in area, and reading data of PMA, are achieved by the execution of various procedures which depend on the need, as far as the operation and application of the optical disk are concerned. However, for whatever functions to be executed, a seeking-and-tracking servo control circuit is always called first to move the pick-up as long as the functions attempt to read/write data from/to the optical disk. After the pick-up head moves to a target area, it executes extracting or writing data from or to the target area through following tracks. The mechanism of seeking is that the seeking-and-tracking servo control circuit reads the present address (acquired by means of the ATIP time code or the subcode-Q data) to confirm the "current position" first after a caller, such as a function which is attempting to read the data stored at the target position, gives a command of getting to a "target position"; then, the jumping direction and distance crossing the tracks are calculated in the light of the relationship between the current position and the target position, and the jumping action is executed in accordance with the result of the calculation. Track locking starts again when the seeking action is done, though it entails reading the present address once again in order to confirm whether the pick-up head reaches the target area. If the arrival of the pick-up head at the target area is confirmed, the seeking action ends; otherwise, the seeking action continues in the light of the relationship between the current position and the target position until the pick-up head reaches the predetermined target area.

In fact, the optical storage device is unable to determine the current position solely by means of the ATIP time code or the subcode-Q data, as it is still necessary to set an area flag which indicates that in or not in a specified area for determining some positions which correspond to overlapping time codes. When the optical storage device drives the pick-up head to get the positions of which time codes are in the time-code-overlap areas, the flag needs to be set for confirming which one of the positions is the target position before calling a seeking-and-tracking servo-control loop. During the process of seeking the target tracks, the seeking-and-tracking servo-control loop reads the address of the current position to determine the next seeking movement and confirm whether it is at the target position or not. If the current position read by the seeking-and-tracking servo-control loop is at the areas of the overlapping time codes, it is necessary to have additional criteria or information to assist the loop in confirming which one of the areas corresponds to the current position. Because seeking motion or tracking (following) motion possibly occurs in the areas of the overlapping time codes, it is necessary to refer to the past trajectory of the pick-up head, such as the direction and distance of the seeking motion and the proceeding distance of the tracking motion, for confirming which one of the areas corresponds to the current position. Hence, the data of the area flag have to be checked out or reset whenever a different application procedure is executed, and auxiliary conditions are continually renewed and judged in the light of variations in the positions of the pick-up head predicted by individual application procedures. Hence, program maintenance is difficult, while omissions are common, especially that the movements of pick-up head are different and complex for many kinds of purposes and operation sequences for optical devices; as a result, any ensuing judgment is indefinite. Furthermore, the complicated examination and configuration which are taking place in the area flag and auxiliary conditions inevitably decrease the execution efficiency of the entire system, not to mention that such an additional confirmation program has not been applied to all optical disks with different formats yet.

SUMMARY OF THE INVENTION

The primary objective of the present invention is to provide a method and an apparatus for determining the position of a pick-up head. The areas of overlapping time codes can be discriminated from each other because the absolute position along the radial direction of an optical disk is detected.

The second objective of the present invention is to provide a method and an apparatus for determining the current position of a pick-up head in the light of absolute conditions, without adding position determining auxiliary conditions or programs to various procedures. As a result, mistakes of logic judgment are unlikely to happen, while system execution efficiency of the optical storage device increases.

In order to achieve the objective, the present invention discloses a method and an apparatus for determining the position of a pick-up head. The displacement of a pick-up head along the radial direction of an optical disk is detected, and the absolute position of the pick-up head is determined by the accumulation of the displacement, hence the apparatus knows which area of the optical disk the pick-up head currently stays.

After obtaining control signals of which the motor drives the pick-up head to move along the radial direction, the apparatus calculates the displacement of the pick-up head during every stroke according the control signals. Afterward, the absolute position is determined by the accumulation of the displacement during all strokes.

Furthermore, a linear displacement sensor is also employed to detect the displacement the pick-up head during every stroke, and then the absolute position of the pick-up head is determined by the accumulation of the displacement.

BRIEF DESCRIPTION OF THE DRAWINGS

The invention will be described according to the appended drawings in which:

FIG. 5 is a diagram about the structure of subcode-Q data in mode 1;

FIG. 6($a$) is a schematic diagram illustrating the scheme of a single-session optical disk;

FIG. 6($b$) is a schematic diagram illustrating the scheme of a multi-session optical disk;

FIG. 8($b$) is a schematic diagram of all strokes for a pick-up head in continuous motion;

FIG. 9($b$) is a functional block diagram of an apparatus for determining the position of a pick-up head in accordance with the present invention;

FIG. 10($b$) a schematic diagram of an apparatus for determining the position of a pick-up head in accordance with the present invention.

PREFERRED EMBODIMENT OF THE PRESENT INVENTION

Figures 1, 2:
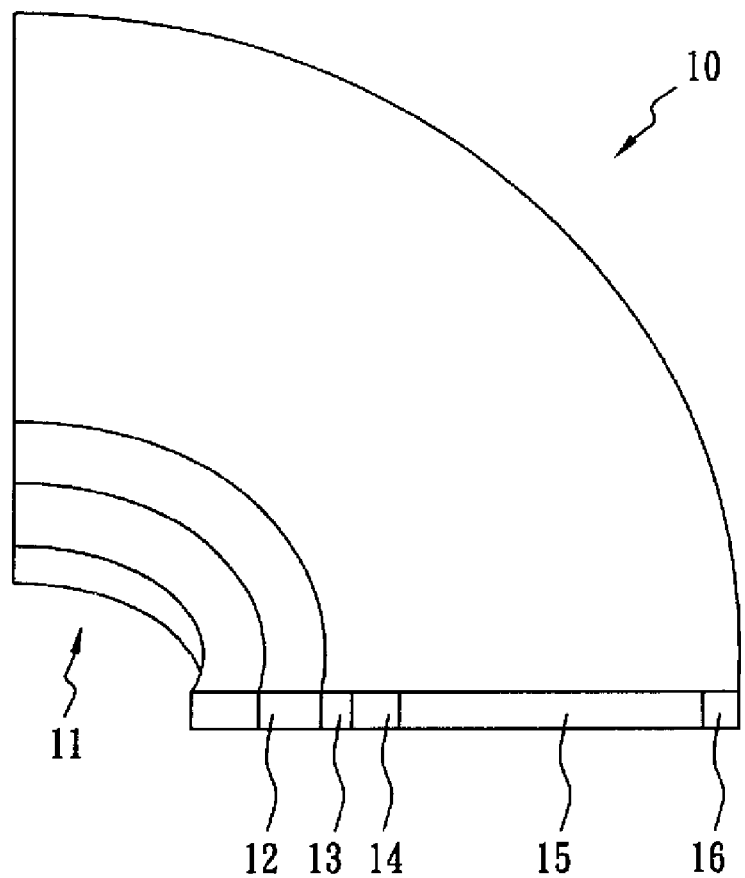
FIG. 1 is a schematic diagram illustrating the information area structure of a quarter of a conventional optical storage medium.
FIG. 2 is a diagram illustrating the scheme of ATIP data.
Figure 3:
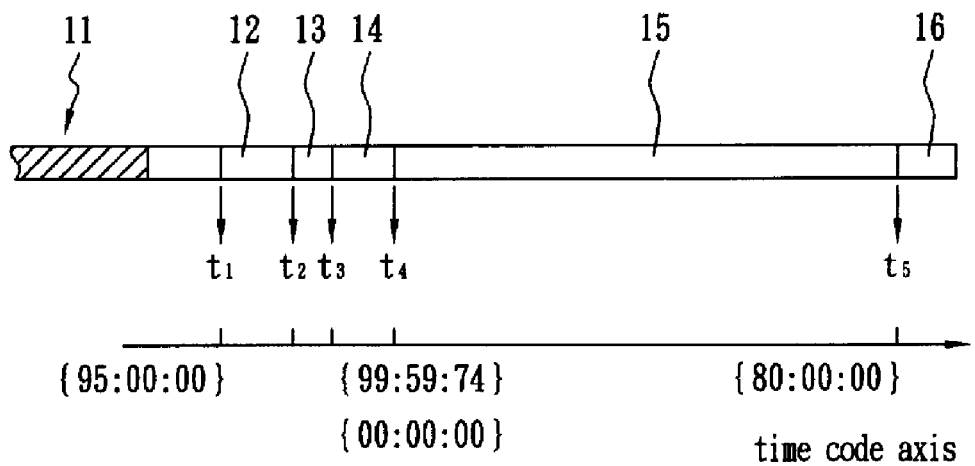
FIG. 3 is a diagram illustrating the corresponding relationship between an information area and an ATIP time code.
Figure 4:
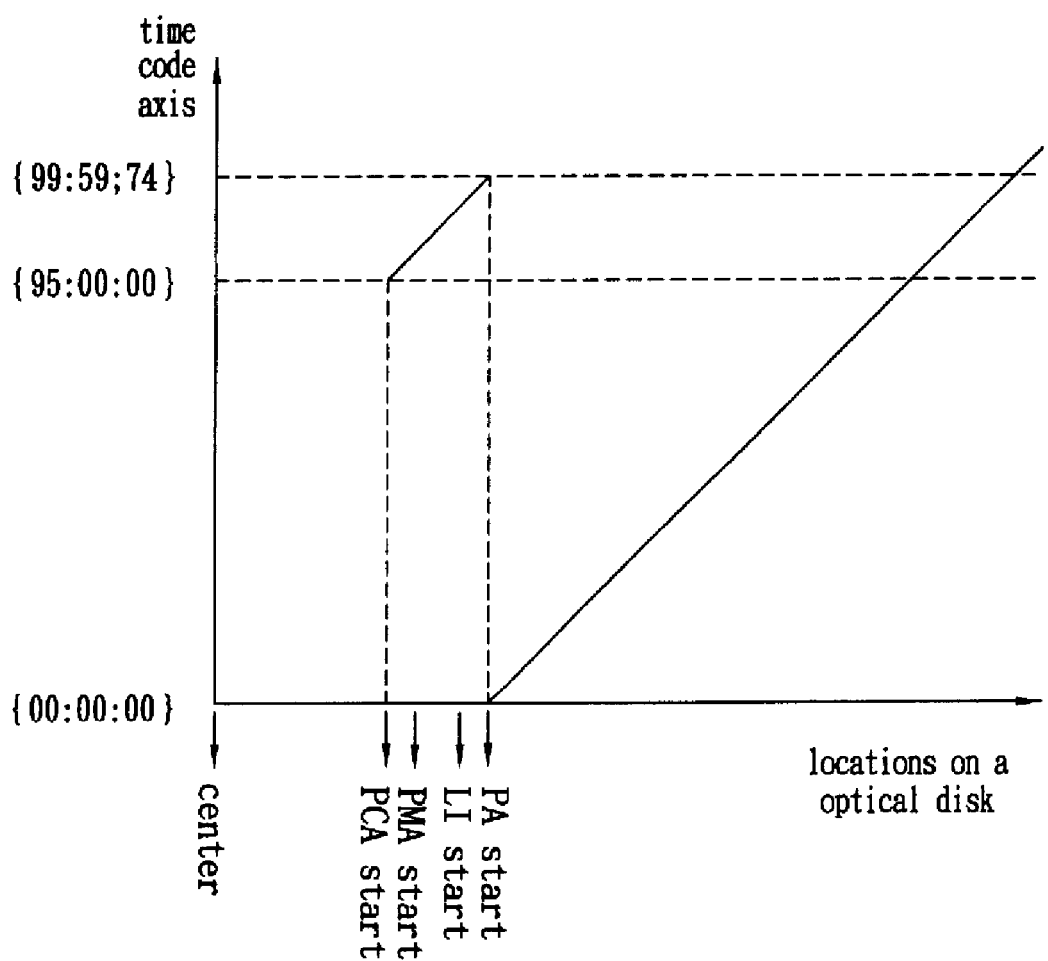
FIG. 4 is a graph of corresponding relationships between the program area of an optical disk and ATIP time code.
Figure 7:
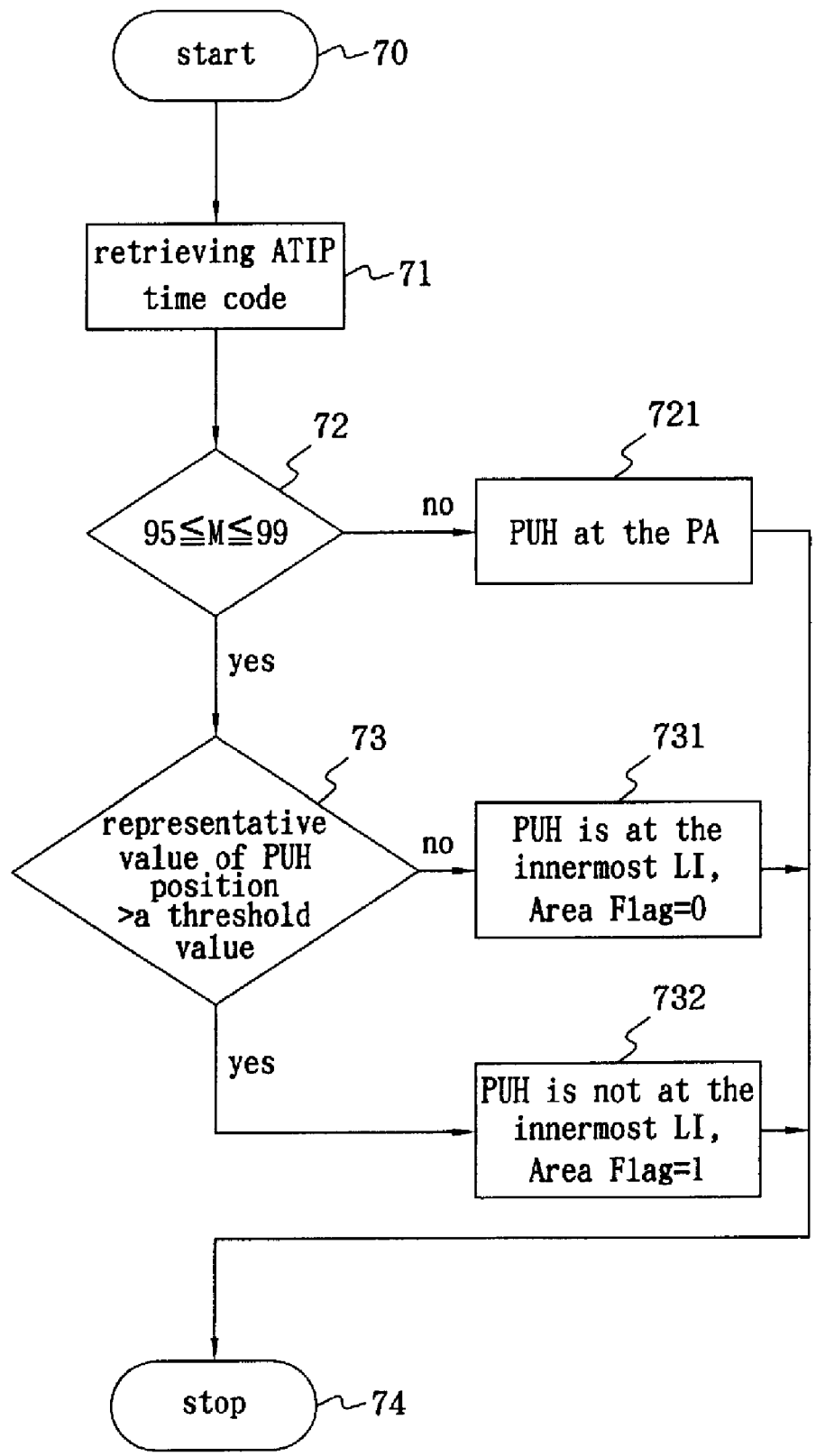
FIG. 7 is a flowchart for determining which one of areas with overlapping address information corresponds to the current position of a pick-up head in accordance with the present invention.

FIG. 7 is a flowchart for determining which one of the areas with overlapping address information corresponds to the current position of a pick-up head in accordance with the present invention. As Step 71 shows, first an optical pick-up head retrieves an ATIP time code, and then it follows Step 72 to determine whether the minute code MM included in the ATIP time code is between 95 minutes and 99 minutes. The present embodiment resolves the problem that usually occurs in the overlapping time codes on a general optical disk with high capacity such as an HC-CDR disk. But the present invention is not limited by the specified overlapping range of the time code in the embodiment. In other words, the lower limit of the overlapping range can be larger or smaller than 95 minutes for a different type disk. When the minute MM of the time code is beyond the range between 95 minutes and 99 minutes, the pick-up head (PUH) surely stays in the PA, as shown in Step 721.

Otherwise, it is necessary to distinguish which one of the areas with overlapping time codes the PUH is at, the LI or the LO. However, the accurate current position of the PUH is not obtained only from the time codes. As shown in Step 73, a representative value of the position of PUH is calculated and is compared with a default threshold value, wherein the calculation of the representative value will be explained in the succeeding paragraph. If the representative value of the PUH position is smaller than the threshold value, the PUH now is at the LI and a position flag Area Flag is set to zero, as shown in Step 731. On the contrary, if the representative value of the PUH position is larger or not smaller than the threshold value, the PUH now is not at the LI and the Area Flag is set to one, as shown in Step 732. The representative value representing the PUH position along the radial direction is directly proportional to the direction from the inside toward the outside along the radius of the optical disk. Therefore, if the representative value is larger than the threshold value after comparison between each other, we are sure that the PUH currently is at the outside rather than at the inside. On the contrary, the PUH currently is at the inside (i.e., lead-in area). Similarly, if the representative value representing the PUH position along the radial direction is reversely proportional to the direction from the inside toward the outside along the radius of the optical disk, the PUH currently is at the inside when the representative value is larger than the threshold value. On the contrary, the PUH currently is not at the inside. The comparison operation in accordance with the present invention depends on the physical position relation in response to the distance between the PUH and the LI. Therefore, the present invention is not limited by either the various ranges of the PUH representative value or the check result such as the representative value larger than a threshold value and the reverse.

Figure 8A:
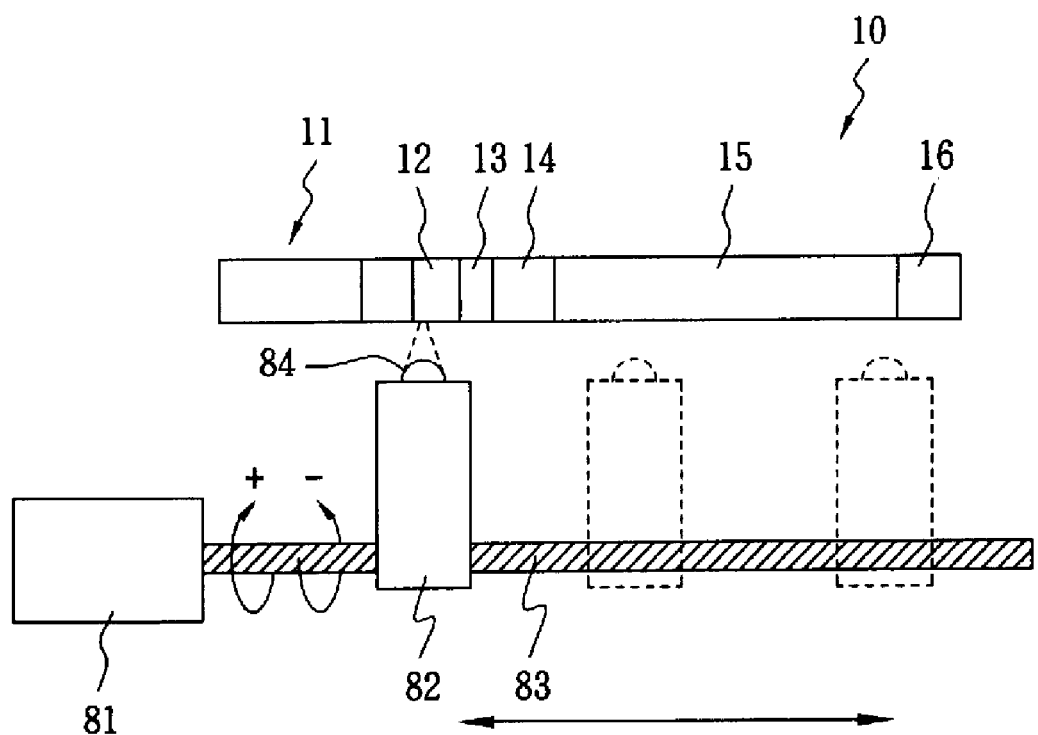
FIG. 8($a$) is a schematic diagram of the motion for a pick-up head to move along the radial direction of an optical disk.
Figure 8B:
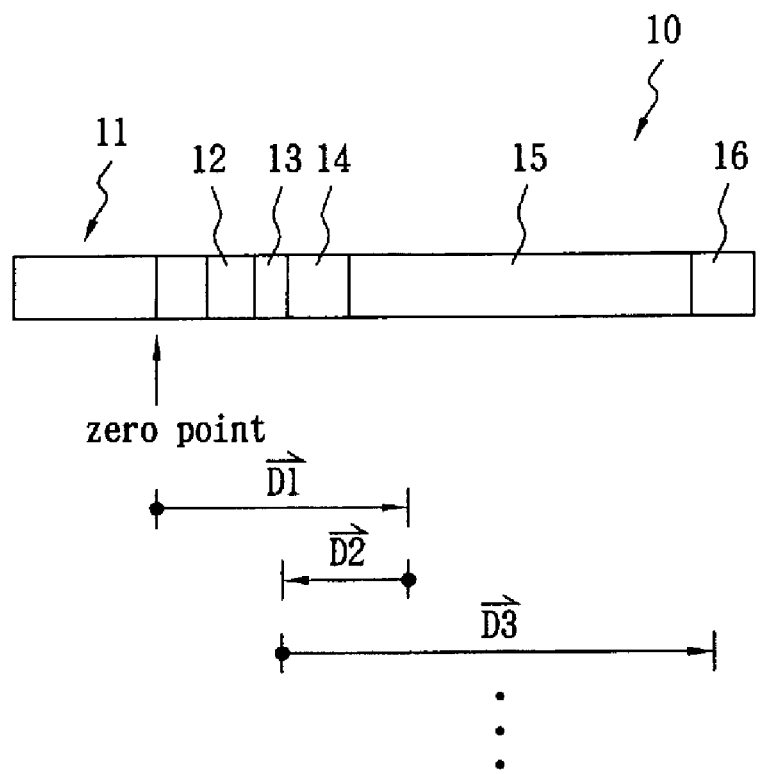

FIG. 8(*a*) is a schematic diagram of the motion for a pick-up head to move along the radial direction of an optical disk. A pick-up head 84 mounted on a base seat 82 is driven to move along the radial direction by a sled motor 81. The sled motor 81 directly outputs torque to a lead screw 83, and then rotation motion is changed into linear motion due to the combination of the lead screw 83 and base seat 82. That is, the PUH has a predetermined linear motion depending on the rotational angle and direction of the lead screw 83.

The PUH 84 continuously jumps across tracks and follows tracks on the optical storage medium 10 to retrieve data thereon. Therefore, it is necessary to gradually accumulate the corresponding displacement of every seeking motion or following motion.

FIG. 8(*b*) is a schematic diagram of all strokes for a pick-up head in continuous motion. First, a zero point or a basic point is defined. For example, the limit point (adjacent to the center hole 11) of radial motion for the UPH 84 is designated as the zero point. The displacement $\vec{D}_1$ of the first stroke is from the zero point to the PA 15, and then the displacement $\vec{D}_2$ of the second stroke, the displacement $\vec{D}_3$ of the third stroke, and all the other displacements can be obtained, as shown in FIG. 8(*b*). Therefore, the representative value $|\vec{D}|$ of the PUH position is given by the following formula.

$$|\vec{D}| = \vec{D}_1 + \vec{D}_2 + \vec{D}_3 + \ldots + \vec{D}_m \quad \text{(Formula 1)}$$

The threshold value can be determined by the distance between the zero point and a designated point arbitrarily chosen from the PA 15. If the representative value is smaller than the threshold value and the read time code is in the overlapping range, the PUH 84 is sure at the LI 14 in the inside; otherwise, the PUH 84 is sure at the LO 16 in the outside.

Figure 9A:
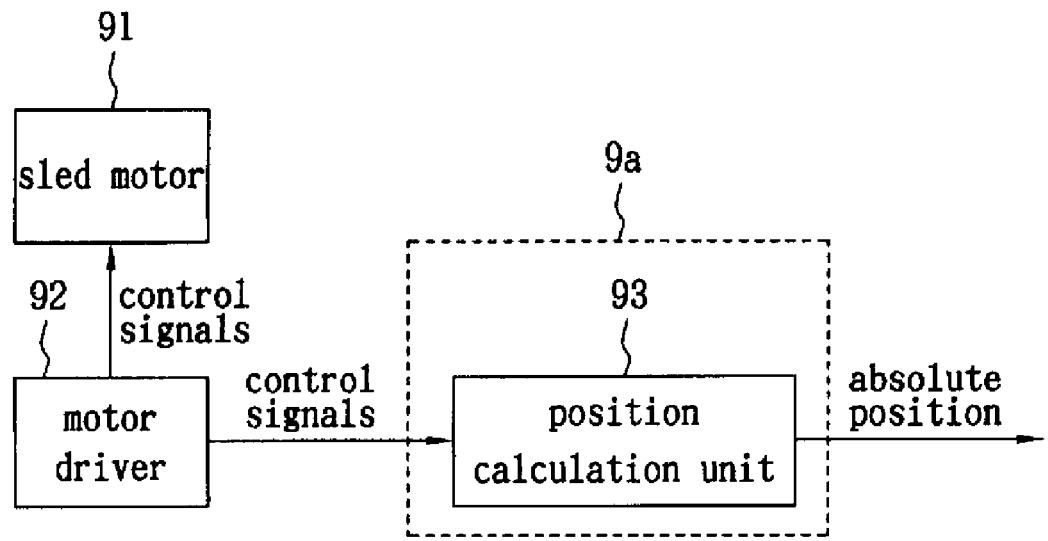
FIG. 9($a$) is a functional block diagram of an apparatus for determining the position of a pick-up head in accordance with the present invention.
Figure 9B:
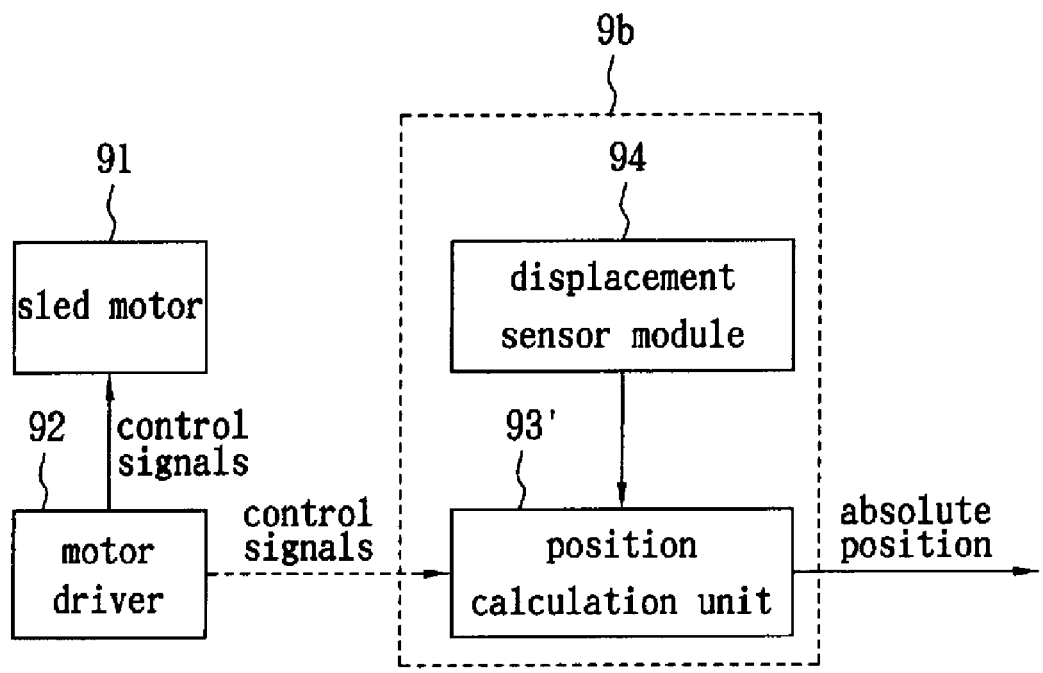

FIG. 9(*a*) is a functional block diagram of an apparatus 9*a* for determining the position of a pick-up head in accordance with the present invention. A motor driver 92 generates control signals including the data of a rotation angle and a direction to control the rotation of the sled motor 91. Therefore, a position calculation unit 93 can obtain the absolute position or the representative position value of the PUH according to the data and Formula 1.

Generally a stepping motor is employed as the sled motor 91, the control signals during every stroke or every period includes n continuous pulses and a rotation direction (+/−). After receiving a pulse, the stepping motor rotates a unit of the stepping angle A. Meanwhile, the lead screw 83 is also driven to rotate around the same angle. If the lead screw 83 rotates around 360 degrees, the PUH moves in a lead pitch. By means of aforesaid criteria, the distance Dm of the m-th stroke is expressed by the following formula.

$$D_m = \frac{A \times n}{360} \times L \quad \text{(Formula 2)}$$

The displacement of a stroke can be derived from the distance of the stroke and its rotation direction. The position calculation unit 93 accumulates all the displacements to have the representative value of the PUH position according to Formula 1.

FIG. 9(*b*) is a functional block diagram of an apparatus for determining the position of a pick-up head in accordance with the present invention. A displacement sensor module 94 detects the displacement signals of the PUH 84 and outputs it to the position calculation unit 93'. The detected displacement signals from the displacement sensor module 94 are interpreted and calculated by a position calculation unit 93' to obtain the absolute position of the PUH 84. If the displacement sensor module 94 is incapable of detecting the direction of the PUH motion, the position calculation unit 93' can directly obtain the corresponding information from the control signals.

Figure 10A:
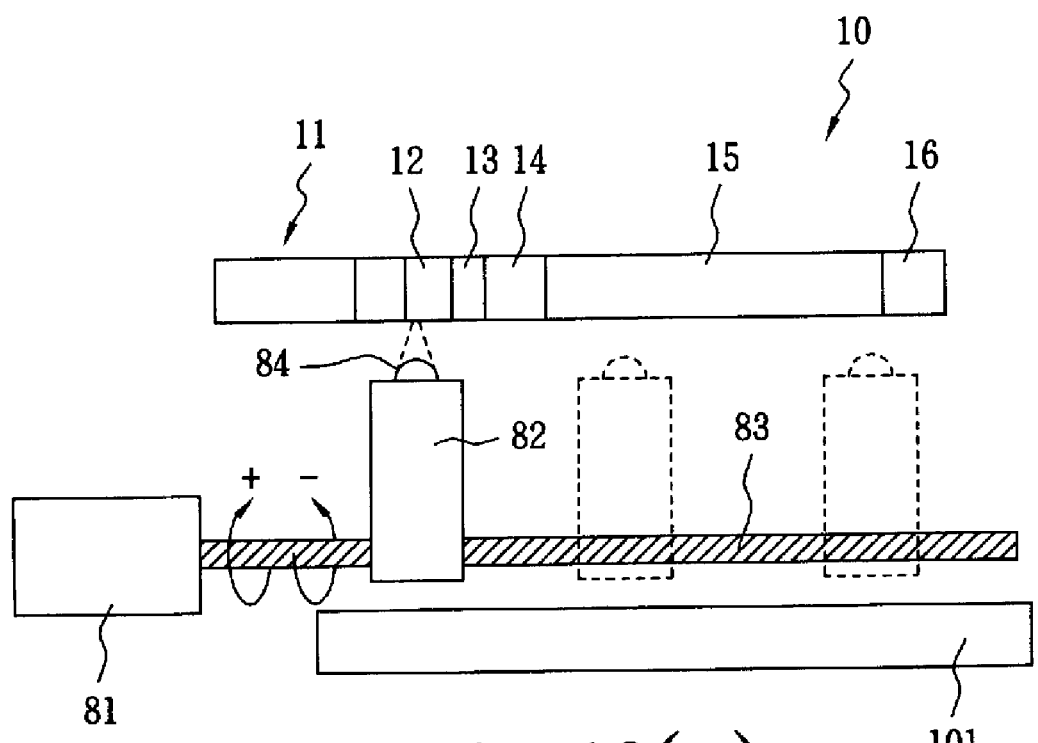
FIG. 10($a$) is a schematic diagram of an apparatus for determining the position of a pick-up head in accordance with the present invention.
Figure 10B:
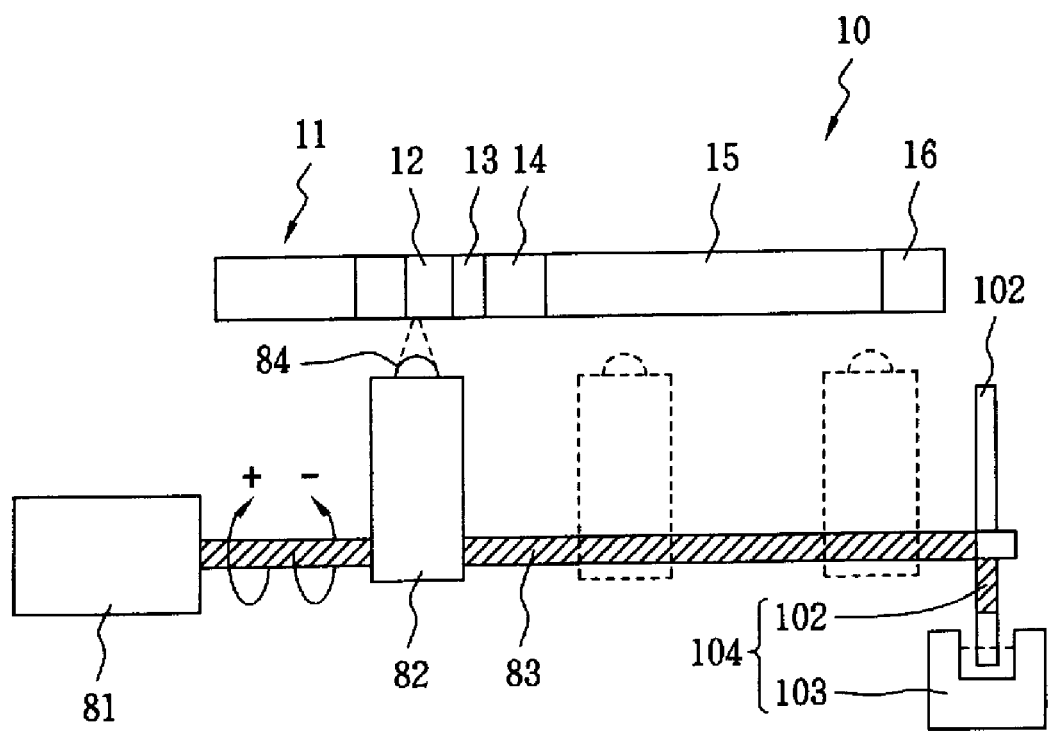

FIGS. 10 (*a*)-10(*b*) show two embodiments further explaining the devices of the displacement sensor module 94. A displacement sensor 101 such as an optical linear scale can detect the displacement signals of the PUH 84 relative to the base seat 82, or an optical sensing component 103 senses the passing numbers of slits or bars on an optical grating wheel 102 mounted on the lead screw 83. Because the slits are equiangularly distributed on the circumference of the optical grating wheel 102, the distance of the displacement can be obtained from Formula 2 through the substitution of the equal divided angle and passing numbers. The optical grating wheel 102 and optical sensing component 103 are designated as the displacement sensor module 94. Furthermore, the control signals also can provide the system with the information of direction, hence the representative value of the PUH position is defined.

To sum up, the present invention has the following advantages, compared to the conventional art:

1. It does not entail adding any position-determining algorithms with auxiliary conditions or programs to various procedures, but instead involves using an absolute condition for judging the current position of a pick-up head, or, in other words, the position of a pick-up head is correctly confirmed against an absolute condition. The present invention is free of judgment logic mistakes, and its programs are simple and therefore easy to maintain, compared with the complicated steps of the conventional art.

2. As regards overlapping time codes for information areas of an optical disk, the positions of related areas in inside tracks are very different from those in outside tracks; they are away from such an extent that individual corresponding radial distances exceed three centimeters, or a radial ratio is greater than two. Therefore, it is not necessary to have a very accurate displacement sensor module or a very accurate position calculation unit to satisfy to distinguish the overlapping address information. If the control signals of the sled motor are employed to distinguish the overlapping address information, no hardware is in demand for such application.

3. Since the absolute position of the PUH is directly obtained, the determination of the PUH position has nothing to do with the spindle rotation mode, spindle rotation frequency and following stability of the optical storage apparatus. The present invention discloses a robust determination method for the PUH position. Therefore, the determination apparatus does not waste time to wait the control system of the optical storage apparatus to be stable, hence it is efficient in performance.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. A method for determining the position of a pick-up head, comprising the steps of:
   designating a basic point on a radial line of an optical disk;
   obtaining the information of displacement of the pick-up head from control signals for driving the pick-up head to move, wherein the information of displacement is based on a relative position between the pick-up head and the basic point during each stroke of the pick-up head; and
   determining a representative position value of the pick-up head on the radial line of the optical disk according to the obtained information of displacement.

2. The method for determining the position of a pick-up head of claim 1, further comprising the step of:
   comparing the representative value of the position of the pick-up head with a predetermined threshold value so as to determine whether the position of the pick-up head is at the outside of the predetermined threshold value if the position of the pick-up head is currently at the ranges in which the address information can not define the actual position entirely, wherein the outside is against the center hole of the optical disk.

3. The method for determining the position of a pick-up head of claim 2, wherein the ranges in which the address information can not define the actual position entirely are areas that have identical ATIP (Absolute Time In Pre-groove) time codes on the optical disk.

4. The method for determining the position of a pick-up head of claim 1, wherein the information of displacement is obtained from the control signals that drive a motor to move the pick-up head.

5. The method for determining the position of a pick-up head of claim 4, further comprising the steps of:
   calculating a distance $D_m$ of each stroke by $$D_m = \frac{A \times n}{360} \times L,$$

wherein n is the number of pulses generated during the m-th stroke by means of the control signals, L is the lead pitch of a lead screw driving the pick-up head, and A is the stepping angle of the motor; and
   obtaining the moving direction of each stroke through the control signals.

6. The method for determining the position of a pick-up head of claim 1, wherein the information of displacement are obtained by a displacement sensor module that detects the displacement distance of the pick-up head during each stroke.

7. The method for determining the position of a pick-up head of claim 5, wherein the moving direction of the displacement is obtained from the control signals.

8. The method for determining the position of a pick-up head of claim 1, wherein the representative position value is the distance between the position of the pick-up head and the basic point.

9. The method for determining the position of a pick-up head of claim 1, further comprising the step of:
   accumulating the displacements of the all stokes to obtain the representative position value.

10. An apparatus for determining the position of a pick-up head, wherein the pick-up head is mounted on a lead screw and a motor drives the lead screw to move the pick-up head along a radial line of an optical disk, comprising:
    a position calculation unit obtaining the information of displacement of the pick-up head from control signals for driving the pick-up head to move and calculating a distance along the radial line between the position of the pick-up head and a basic point according to the information of displacement, wherein the information of displacement is based on a relative position between the pick-up head and the basic point during each stroke of the pick-up head.

11. The apparatus for determining the position of a pick-up head of claim 10, wherein the position calculation unit obtains the displacement of each stroke and accumulates the displacement to calculate the distance between the position of the pick-up head and basic point.

12. The apparatus for determining the position of a pick-up head of claim 10, wherein the information of the displacement includes the pulse number and rotation direction of each stroke retrieved from the control signals for the motor.

13. The apparatus for determining the position of a pick-up head of claim 12, wherein the distance $D_m$ of each stroke is calculated by $$D_m = \frac{A \times n}{360} \times L,$$

wherein n is the pulse number generated during the m-th stroke by means of the control signals, L is the lead pitch of the lead screw, and A is the stepping angle of the motor.

14. The apparatus for determining the position of a pick-up head of claim 10, further comprising a displacement sensor module detecting the position of the pick-up head to output the information of the displacement.

15. The apparatus for determining the position of a pick-up head of claim 14, wherein the displacement sensor module detects the displacement of the pick-up head during each stroke.

16. The apparatus for determining the position of a pick-up head of claim 15, wherein the moving direction of the displacement of the pick-up head is obtained from the control signals during each stroke.

17. The apparatus for determining the position of a pick-up head of claim 14, wherein the displacement sensor module detects the rotation angle of the lead screw during each stroke.

18. The apparatus for determining the position of a pick-up head of claim 14, wherein the displacement sensor module includes an optical grating wheel with a plurality of holes or slits and an optical sensing component detecting the existence of the holes or slits.

19. The apparatus for determining the position of a pick-up head of claim 14, wherein the basic point is a limit point for the pick-up head moving along the radial line of the optical disk.

20. An apparatus for determining the position of a pick-up head, wherein the pick-up head is mounted on a lead screw and a motor drives the lead screw to move the pick-up head along a radial line of an optical disk, comprising:

a position calculation unit obtaining the information of displacements of the pick-up head and calculating a distance along the radial line between the position of the pick-up head and a basic point according to the information of displacement, wherein the distance is function of a pulse number applied to the motor during a stroke, a lead pitch of the lead screw, and a stepping angle of the motor.

21. A method for determining the position of a pick-up head, comprising the steps of:
designating a basic point on a radial line of an optical disk;
obtaining the information of displacement of the pick-up head relative to the basic point along the radial line of the optical disk for a pick-up head during each stroke;
calculating a distance of each stroke based on the information of displacement, wherein the distance is a function of a pulse number applied to a motor powering the pick-up head during a stroke, a lead pitch of a lead screw driving the pick-up head, and a stepping angle of the motor; and
determining the representative position value of the pick-up head on the radial line of the optical disk according to the distance.

* * * * *